United States Patent
Che

(10) Patent No.: US 11,398,084 B2
(45) Date of Patent: Jul. 26, 2022

(54) METHOD, APPARATUS AND APPLICATION SYSTEM FOR EXTRACTING A TARGET FEATURE

(71) Applicant: HANGZHOU HIKVISION DIGITAL TECHNOLOGY CO., LTD., Hangzhou (CN)

(72) Inventor: Jun Che, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/627,017

(22) PCT Filed: Jun. 28, 2018

(86) PCT No.: PCT/CN2018/093291
§ 371 (c)(1),
(2) Date: Dec. 27, 2019

(87) PCT Pub. No.: WO2019/001505
PCT Pub. Date: Jan. 3, 2019

(65) Prior Publication Data
US 2020/0117946 A1  Apr. 16, 2020

(30) Foreign Application Priority Data
Jun. 30, 2017 (CN) .......................... 201710527437.4

(51) Int. Cl.
*G06K 9/46* (2006.01)
*G06K 9/66* (2006.01)
(Continued)

(52) U.S. Cl.
CPC ............ *G06V 10/462* (2022.01); *G06T 7/246* (2017.01); *G06T 7/292* (2017.01); *H04N 5/232* (2013.01);
(Continued)

(58) Field of Classification Search
CPC ....... G06T 7/292; G06T 7/246; G06K 9/4671; H04N 5/232
(Continued)

(56) References Cited

U.S. PATENT DOCUMENTS

2008/0279425 A1 * 11/2008 Tang .................. G06K 9/00221
382/118
2016/0344928 A1   11/2016 Qu et al.
(Continued)

FOREIGN PATENT DOCUMENTS

CN    101068342 A    11/2007
CN    102148965 A    8/2011
(Continued)

OTHER PUBLICATIONS

The Partial Supplementary European Search Report of the corresponding European application No. 18823010.6 issued by the EPO dated Apr. 17, 2020.
(Continued)

*Primary Examiner* — Stephen P Coleman
(74) *Attorney, Agent, or Firm* — Meunier Carlin & Curfman LLC

(57) ABSTRACT

The embodiment of the present application provides a method, apparatus and application system for extracting a target feature. The method includes: acquiring target area video data captured by a panoramic camera; determining, by a target detection algorithm, a tracking target having a preset feature in the target area video data; allocating the tracking target to a detail camera, such that the detail camera tracks the tracking target and acquires close-up video data of the tracking target; extracting, from the close-up video data, attribute information of the tracking target. With the embodiment of the present application, attribute information of each
(Continued)

target can be accurately extracted, improving the accuracy of extracting the attribute information of the target.

10 Claims, 3 Drawing Sheets

(51) Int. Cl.
  *G06V 10/46* (2022.01)
  *G06T 7/292* (2017.01)
  *G06T 7/246* (2017.01)
  *H04N 5/232* (2006.01)
(52) U.S. Cl.
  CPC .............. *G06T 2207/10016* (2013.01); *G06T 2207/20081* (2013.01)
(58) Field of Classification Search
  USPC ........................................................ 382/190
  See application file for complete search history.

(56) References Cited

U.S. PATENT DOCUMENTS

| | | | | |
|---|---|---|---|---|
| 2017/0061249 | A1* | 3/2017 | Estrada | G06T 5/005 |
| 2017/0345181 | A1 | 11/2017 | Yu | |
| 2018/0107660 | A1* | 4/2018 | Wang | G06F 16/5854 |
| 2018/0286065 | A1* | 10/2018 | Knorr | G06T 7/579 |

FOREIGN PATENT DOCUMENTS

| | | | |
|---|---|---|---|
| CN | 102902884 | A | 1/2013 |
| CN | 103105858 | A | 5/2013 |
| CN | 104125433 | A | 10/2014 |
| CN | 104301669 | A | 1/2015 |
| CN | 104378539 | A | 2/2015 |
| CN | 104883548 | A | 9/2015 |
| CN | 105338248 | A | 2/2016 |
| CN | 105407283 | A | 3/2016 |
| CN | 105472239 | A | 4/2016 |
| CN | 105812746 | A | 7/2016 |
| CN | 105872477 | A | 8/2016 |
| CN | 105893510 | A | 8/2016 |
| CN | 105930822 | A | 9/2016 |
| CN | 106034207 | A | 10/2016 |
| CN | 106127807 | A | 11/2016 |
| CN | 106341612 | A | 1/2017 |
| CN | 106354816 | A | 1/2017 |
| CN | 205883405 | U | 1/2017 |
| CN | 106503614 | A | 3/2017 |
| CN | 106503622 | A | 3/2017 |
| CN | 106506941 | A | 3/2017 |

OTHER PUBLICATIONS

Iraqui, Amine, et al. "Fusion of omnidirectional and ptz cameras for face detection and tracking." 2010 International Conference on Emerging Security Technologies. IEEE, 2010, pp. 18-23.

Lensen, Henk A., et al. "Application of heterogeneous multiple camera system with panoramic capabilities in a harbor environment." SPIE—International Society for Optical Engineering. Proceedings, vol. 7305, 2009.p. 73050B.

Zhao, Xiaomeng, et al. "Metadata extraction and correction for large-scale traffic surveillance videos." 2014 IEEE International Conference on Big Data (Big Data). IEEE, 2014, pp. 412-420.

* cited by examiner

METHOD, APPARATUS AND APPLICATION SYSTEM FOR EXTRACTING A TARGET FEATURE

The present application claims the priority to a Chinese patent application No. 201710527437.4, filed with the China National Intellectual Property Administration on Jun. 30, 2017 and entitled "Method, Apparatus and Application System for Extracting A Target Feature", which is incorporated herein by reference in its entirety.

TECHNICAL FIELD

The present application relates to the field of computer vision technology, and in particular, to a method and apparatus for extracting a target feature, and application system.

BACKGROUND

At present, a wide-angle camera and a telephoto camera can be used to capture a video for a certain area. The wide-angle camera is mainly used to capture videos of large-range and long-distance targets, and the telephoto camera is used to capture videos of short-range targets at a certain angle of view. In practical applications, a wide-angle camera and a telephoto camera may be combined to capture a video in a target area, and then target information in the video is extracted through a video structured technology.

In a related technology, a method for extracting a target in a video structured process mainly includes: capturing video data in a monitoring area by a wide-angle camera, and extracting targets in the video data and a space-time position of each target by background modeling. Meanwhile, a telephoto camera is controlled to track and capture each target, obtain video data of each target, and extract a feature image in the video data of each target.

However, in the above method, in extracting the targets in the video data of the wide-angle camera by background modeling, when a sudden situation occurs, for example, camera shake, illumination variation, sudden change in capturing scene (for example, there are thrown articles on the ground), and so on, the camera may capture false targets, which affects the accuracy and robustness of extracting the targets. In addition, in extracting targets in the video data, it is necessary to extract all moving targets in the video data. When multiple targets are adhered in the video data, the telephoto camera may track and capture the adhered targets as a whole target, In this way, features and attributes of each of the targets cannot be accurately extracted from the video data obtained by the telephoto camera, thereby affecting the accuracy of extraction.

SUMMARY

The purpose of the embodiments of the present application is to provide a method, apparatus and application system for extracting a target feature to improve the accuracy of extracting attribute information of a target. Specifically, the technical solutions are as follows.

In a first aspect, an embodiment of the present application provides a method for extracting a target feature, including:
  acquiring target area video data captured by a panoramic camera;
  determining, by a target detection algorithm, a tracking target having a preset feature in the target area video data;
  allocating the tracking target to a detail camera, so as to cause the detail camera to track the tracking target and acquire close-up video data of the tracking target; and
  extracting attribute information of the tracking target in the close-up video data.

Optionally, the step of determining, by a target detection algorithm, a tracking target having a preset feature in the target area video data includes:
  acquiring a video frame of the target area video data;
  extracting image features of the video frame through a preset target detection model, wherein the preset target detection model is trained and obtained based on a plurality of targets having the preset feature; and
  matching the image features with a preset target detection feature, and determining an
  image feature matching the preset target detection feature as a tracking target, wherein the preset target detection feature is a set of targets having the preset feature.

Optionally, the tracking target includes one or more tracking targets; the step of allocating the tracking target to a detail camera so as to cause the detail camera to track the tracking target and acquire close-up video data of the tracking target includes:
  after acquiring the video frame of the target area video data, acquiring first coordinates of each of the tracking targets in the video frame of the target area video data;
  allocating, according to the first coordinates, one detail camera for each of the tracking targets;
  converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

Optionally, the step of extracting attribute information of the tracking target in the close-up video data includes:
  acquiring close-up video frames in the close-up video data;
  obtaining, according to a target scoring model, scoring results of the close-up video frames, and selecting a close-up video frame with the highest scoring result; and
  extracting, from the close-up video frame with the highest scoring result, at least one piece of attribute information of the tracking target.

Optionally, the method further includes:
  establishing a target index for the tracking target based on identification information and the at least one piece of attribute information of the tracking target, wherein the tracking target includes one or more tracking targets, and the identification information is obtained by respectively identifying each of the tracking targets after determining the tracking targets having a preset feature in the target area video data;
  determining whether the target index matches a stored index;
  if the target index does not match a stored index, storing the target index, and if the target index matches a stored index, discarding the target index.

In a second aspect, an embodiment of the present application provides an apparatus for extracting a target feature, including:
  an acquiring unit, configured for acquiring target area video data captured by a panoramic camera;

a determining unit, configured for determining, by a target detection algorithm, a tracking target having a preset feature in the target area video data;

an allocating unit, configured for allocating the tracking target to a detail camera so as to cause the detail camera to track the tracking target and acquire close-up video data of the tracking target; and an extracting unit, configured for extracting attribute information of the tracking target in the close-up video data.

Optionally, the determining unit is specifically configured for:

acquiring a video frame of the target area video data; extracting image features of the video frame through a preset target detection model, wherein the preset target detection model is trained and obtained based on a plurality of targets having the preset feature; and matching the image features with a preset target detection feature, and determining an image feature matching the preset target detection feature as a tracking target, wherein the preset target detection feature is a set of targets having the preset feature.

Optionally, the tracking target includes one or more tracking targets; the allocating unit is specifically configured for:

after acquiring the video frame of the target area video data, acquiring first coordinates of each of the tracking targets in the video frame of the target area video data; allocating, according to the first coordinates, one detail camera for each of the tracking targets; converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

Optionally, the extracting unit is specifically configured for:

acquiring close-up video frames in the close-up video data; obtaining, according to a target scoring model, scoring results of the close-up video frames, and selecting a close-up video frame with the highest scoring result; and extracting, from the close-up video frame with the highest scoring result, at least one piece of attribute information of the tracking target.

Optionally, the apparatus further includes:

an index unit, configured for establishing a target index for the tracking target based on identification information and the at least one piece of attribute information of the tracking target, wherein the tracking target includes one or more tracking targets, and the identification information is obtained by respectively identifying each of the tracking targets after determining the tracking targets having the preset feature in the target area video data;

a judging unit, configured for determining whether the target index matches a stored index;

a processing unit, configured for if the target index does not match a stored index, storing the target index, and if the target index matches a stored index, discarding the target index.

In a third aspect, an embodiment of the present application provides an application system for extracting a target feature, including a panoramic camera, a video processor, and a detail camera;

wherein the panoramic camera is configured for capturing target area video data;

the video processor is configured for acquiring the target area video data captured by the panoramic camera; determining, by a target detection algorithm, a tracking target having a preset feature in the target area video data; allocating the tracking target to the detail camera so as to cause the detail camera to track the tracking target and acquire close-up video data of the tracking target; and extracting attribute information of the tracking target in the close-up video data; and the detail camera is configured for tracking the tracking target and acquiring the close-up video data of the tracking target.

Optionally, the video processor is specifically configured for acquiring a video frame of the target area video data; extracting image features of the video frame through a preset target detection model, wherein the preset target detection model is trained and obtained based on a plurality of targets having the preset feature; and matching the image features with a preset target detection feature, and determining an image feature matching the preset target detection feature as a tracking target, wherein the preset target detection feature is a set of targets having the preset feature.

Optionally, the video processor is specifically configured for after acquiring the video frame of the target area video data, acquiring first coordinates of each of the tracking targets in the video frame of the target area video data; allocating, according to the first coordinates, one detail camera for each of the tracking targets; converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

Optionally, the video processor is specifically configured for acquiring close-up video frames in the close-up video data; obtaining, according to a target scoring model, scoring results of the close-up video frames, and selecting a close-up video frame with the highest scoring result; and extracting, from the close-up video frame with the highest scoring result, at least one piece of attribute information of the tracking target.

Optionally, the video processor is further specifically configured for:

establishing a target index for the tracking target based on identification information and the at least one piece of attribute information of the tracking target, wherein the tracking target includes one or more tracking targets, and the identification information is obtained by respectively identifying each of the tracking targets after determining the tracking targets having the preset feature in the target area video data; determining whether the target index matches a stored index; if the target index does not match a stored index, storing the target index, and if the target index matches a stored index, discarding the target index.

In a fourth aspect, an embodiment of the present application provides a computer device, which includes a processor, a communication interface, a memory and a communication bus, wherein the processor, the communication interface, and the memory communicate with each other via the communication bus;

the memory is configured for storing a computer program; and the processor is configured for performing the method for extracting a target feature described in the present application when executing the program stored on the memory.

In a fifth aspect, an embodiment of the present application further provides a computer readable storage medium. The computer readable storage medium stores a computer program therein, and the computer program, when executed by a processor, implements the method for extracting a target feature described in the present application.

The embodiments of the present application provides a method, apparatus and application system for extracting a target feature. The method for extracting a target feature is applied to a video processor in the application system for extracting a target feature, and the video processor may acquire target area video data captured by a panoramic camera, and the video processor may determine a tracking target having a preset feature in the target area video data by a target detection algorithm. At this time, the video processor may allocate the tracking target to a detail camera, such that the detail camera tracks the tracking target and acquires close-up video data of the tracking target, and then the video processor may extract attribute information of the tracking target from the close-up video data.

In the present application, a video processor may determine, by a target detection algorithm, a tracking target having a preset feature in target area video data. As such, the video processor may select targets meeting user requirements in the target area video data, and then the video processor may extract attribute information of each of the selected targets. In this way, the accuracy of extracting the attribute information of the targets can be improved. It should be understood that any product or method of the present application does not necessarily achieve all of the advantages described above.

BRIEF DESCRIPTION OF THE DRAWINGS

In order to more clearly describe the technical solutions of the embodiments of the present application and the related technology, drawings that need to be used in embodiments and the related technology will be briefly described below. Apparently, the drawings described below are for only some embodiments of the present application; those skilled in the art can also obtain other drawings based on these drawings without any creative efforts.

DETAILED DESCRIPTION

The technical solutions of the present application will be described in more detail below with reference to the appended drawings and embodiments. Apparently, the described embodiments are only some, and not all, of the embodiments of the present application. All other embodiments obtained based on the embodiments of the present application by those skilled in the art without any creative efforts fall into the scope of protection defined by the present application.

It should be noted that, the embodiments in the present application and the features in the embodiments may be combined to each other without conflict. The application will be described in detail below with reference to the drawings and embodiments.

In a related video structured extraction target method, video data of a monitoring area is captured mainly by a wide-angle camera, and then targets and time-space positions in the video data are acquired. For each target, this target is tracked and captured by a telephoto camera to obtain a feature image of this target. However, when a sudden situation occurs, such as a camera shake, an illumination variation, a sudden change in a capturing scene (for example, there are thrown articles on the ground), and so on, the camera may capture false targets, which affects the accuracy and robustness of extracting the targets. In addition, in extracting targets in the video data, when multiple targets are adhered in the video data, the adhered targets may be tracked and captured as a whole target. In this way, features and attributes of the targets cannot be accurately extracted.

Figure 1:
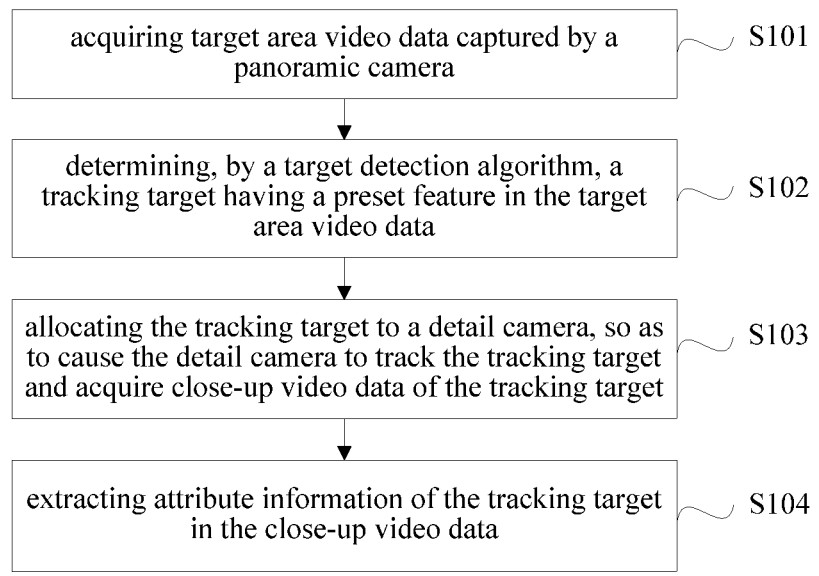
FIG. 1 is a flowchart of a method for extracting a target feature according to an embodiment of the present application.

In order to improve the accuracy of extracting attribute information of targets, the embodiments of the present application provide a method for extracting a target feature. As shown in FIG. 1, the method may include the following steps.

S101, acquiring target area video data captured by a panoramic camera.

The method provided by the embodiment of the present application may be applied to a video processor. The video processor may be integrated in a panoramic camera or a terminal device (for example, a computer), or the video processor may be an electronic device.

The panoramic camera may be one or more wide-angle cameras, and the number of the wide-angle cameras can be determined according to the size of a target area. For example, if one wide-angle camera is sufficient to monitor the target area, one wide-angle camera is installed in the target area. If one wide-angle camera cannot monitor the entire target area, at least two wide-angle cameras can be installed in this target area. The panoramic camera may also be a camera composed of multiple lenses, which is not limited in the present application.

In an embodiment of the present application, the panoramic camera can capture the target area, and then the video processor can acquire target area video data captured by the panoramic camera.

S102, determining, by a target detection algorithm, a tracking target having a preset feature in the target area video data.

The target detection algorithm may include, but not be limited to, Boosting (constructing a series of prediction functions and combining the series of prediction functions into a prediction function in a certain way), RCNN (Region with Convolutional Neural Networks), FRCNN (Fast Region with Convolutional Neural Networks), Faster RCNN (Faster Region with Convolutional Neural Networks), and so on.

In an embodiment of the present application, in order to extract a target(s) required by the user from the target area video data, the target region video data may be processed by any one of the foregoing target detection algorithms to obtain a tracking target(s). Each tracking target has a preset feature. For example, a preset feature of a vehicle may include, but not be limited to, license plate information, a vehicle lamp, a vehicle type (truck, car, off-road vehicle, etc.), a body color, and so on.

In an embodiment of the present application, the video processor may acquire, in the target area video data, at least one video frame that is temporally successive, and process the acquired video frame by the above target detection algorithm. That is, the video processor can extract an image feature in the at least one video frame through a preset target detection model. Specifically, the preset target detection model may be trained and obtained based on multiple targets having a preset feature. In the embodiment of the present application, the preset target detection model is specifically a model trained and obtained with a large number of target samples through a convolutional neural network. Furthermore, the video processor can match the acquired image feature with a preset target detection feature, and determine an image feature matching the preset target detection feature as a tracking target. The preset target detection feature is a set of targets having the preset feature. For example, the preset target detection feature may include, but not be limited to, features of a human and/or features of a vehicle. For example, the features of a human may include, but not be limited to, hair, arms, hands, gender, clothing style, whether to wear glasses, and the like. The features of a vehicle may include, but not be limited to, vehicle size, vehicle model, vehicle color, and the like.

For example, a preset target detection model may be trained and obtained by inputting a large amount of sample data (for example, sample data for 100 people) in a convolutional neural network. The embodiment of the present application may use related technologies for different targets such as a human, motor vehicle, non-motor vehicle, etc., to obtain preset target detection models corresponding to different sample data.

S103, allocating the tracking target to a detail camera so as to cause the detail camera to track the tracking target and acquire close-up video data of the tracking target.

In an embodiment of the present application, after determining a tracking target(s), the video processor may allocate the tracking target(s) to a detail camera(s) according to the number of tracking targets. For example, when there is one tracking target, the tracking target may be allocated to any one detail camera, or a detail camera closest to the tracking target. When there are a plurality of tracking targets, the plurality of tracking targets may be allocated to one or more detail cameras. In this way, the detail camera may track and capture the allocated tracking target, to acquire close-up video data of the tracking target.

The detail cameras may include one or more zoom cameras. Each detail camera may carry one pan-tilt which is rotatable, and has a variable pitch angle. The video processor may control a capturing angle and direction of each detail camera by controlling the pan-tilt, which is not limited herein.

In an embodiment of the present application, after acquiring a video frame of target area video data, the video processor may acquire first coordinates of each tracking target in the video frame of target area video data, wherein, the first coordinates are position coordinates of the tracking target in the target area. Each position in the target area has corresponding coordinates. The video processor may obtain the position coordinates of the tracking target in the target area according to the position of the tracking target in the video frame.

Optionally, the video processor may allocate one detail camera for each tracking target according to the first coordinates. In practical applications, the detail cameras may be uniformly disposed in the target area in advance. If a corresponding position of the first coordinates (x1, y2, z3) of a tracking target A in the target area is closest to a detail camera a, the detail camera a may be allocated to the tracking target A.

In addition, the video processor may convert the first coordinates of each tracking target to second coordinates of this tracking target in the allocated detail camera, and send the second coordinates and the tracking target to the allocated detail camera, such that the detail camera may track and capture the allocated tracking target and thus capture close-up video data of the tracking target. The first coordinates of each tracking target corresponds to different second coordinates in different detail cameras.

In one case, the above close-up video data in the embodiment of the present application may be video data in which the ratio of the size of the included tracking target to the size of the video frame is larger than a preset ratio, or video data including only the tracking target, or video data of the included tracking target at a specified position, for example, the included tracking target in the middle area of the video frame.

For example, the tracking targets include: tracking target A (first coordinates: $x_{11}$, $y_{12}$, $z_{13}$), tracking target B (first coordinates: $x_{21}$, $y_{22}$, $z_{23}$), tracking target C (first coordinates: $x_{31}$, $y_{32}$, $z_{33}$), and the detail cameras include: detail camera a, detail camera b, detail camera c and detail camera d. Since the positions of the detail cameras are different, second coordinates of a tracking target in the detail cameras are different. The video processor may allocate the tracking target A to the detail camera b, then the video processor may convert the first coordinates ($x_{11}$, $y_{12}$, $z_{13}$) of the tracking target A to the second coordinates ($P_{b1}$, $T_{b2}$, $Z_{b3}$) of the tracking target A in the detail camera b. Accordingly, the detail camera b tracks the tracking target A in the target area with the second coordinates ($P_{b1}$, $T_{b2}$, $Z_{b3}$) and acquires close-up video data of the tracking target A. For example, the video processor may allocate the tracking target A to the detail camera c, then the video processor may convert the first coordinates ($x_{11}$, $y_{12}$, $z_{13}$) of the tracking target A to the second coordinates ($P_{c1}$, $T_{c2}$, $Z_{c3}$) of the tracking target A in the detail camera c. Accordingly, the detail camera c tracks the tracking target A in the target area with the second coordinates ($P_{c1}$, $T_{c2}$, $Z_{c3}$) and acquires close-up video data of the tracking target A.

In an embodiment of the present application, the positions of the panoramic camera and the detail camera are set in advance. The position of the tracking target in the target area corresponds to its unique first coordinates in the panoramic camera. Since the position of the detail camera is set in advance, a correspondence between the first coordinates of the tracking target and the second coordinates of the tracking target in the detail camera is determined.

S104, extracting attribute information of the tracking target in the close-up video data.

In an implementation of the present application, the video processor may be integrated in the detail camera, or may be integrated in the panoramic camera, or may be integrated in other electronic devices. The video processor may acquire close-up video data from each of detail cameras, and extract attribute information of the tracking target from the close-up video data. Specifically, the attribute information of the tracking target may include, but not be limited to a human face feature, human body feature, and vehicle feature, and so on.

Specifically, the video processor may acquire, in the close-up video data, close-up video frames of one tracking target which are continuous in time, and obtain a scoring result of each of close-up video frames according to a target scoring model. Further, the video processor may select the close-up video frame with the highest scoring result, and extract at least one piece of attribute information of the tracking target from the close-up video frame with the highest scoring result.

The target scoring model may be a model trained and obtained with various types of target sample data in advance, and the sample data includes, but is not limited to, image quality, definition, target pose, and so on. For example, sample data of 1000 video frames are acquired in advance. The sample data of each video frame is ranked, and a score is set for the sample data of this video frame according to a ranked result. The higher the rank is, the higher the score is. For example, the image quality may include: excellent, good, medium, and poor. The image quality of the video frame is scored. Similarly, the definition, target pose and the like of the video frame are scored. The information, such as image quality, definition, target pose and the like, of each video frame is acquired, and then the information, such as image quality, definition, target pose and the like, of each video frame is scored according to the target scoring model, to obtain a video frame with the highest scoring result. At least one piece of attribute information of the tracking target in the video frame with the highest scoring result is extracted.

When the tracking target is a human, the at least one piece of attribute information may include, but not be limited to, gender, age, upper garment color, lower garment color, clothing type, clothing style, whether he/she carries a pack on his/her back, whether he/she carries a bag, whether he/she wears glasses, whether he/she wears a hat, whether he/she rides a bicycle, and so on.

When the tracking target is a vehicle, the at least one piece of attribute information may include, but not be limited to, license plate information, license plate color, vehicle type, body color, vehicle brand, whether main and auxiliary drivers wear seat belts, whether there is a pendant, whether there is a decoration, whether there are annual inspection marks and the number of the marks and so on.

In an embodiment of the present application, the video processor may acquire at least one video frame in target area video data, and determine, by a target detection algorithm, a tracking target(s) having a preset feature in at least one video frame. Then, the video processor may allocate the tracking targets to different detail cameras. As such, the video processor may track and capture the allocated tracking target(s), and send captured close-up video data of the tracking target(s) to the video processor. The video processor may acquire continuous video frames in the close-up video data of the tracking target, select a video frame with the highest scoring result according to a target scoring model, and then extract attribute information of the tracking target from the video frame with the highest scoring result. In this way, the accuracy of extracting attribute information of the target can be improved.

Figure 2:
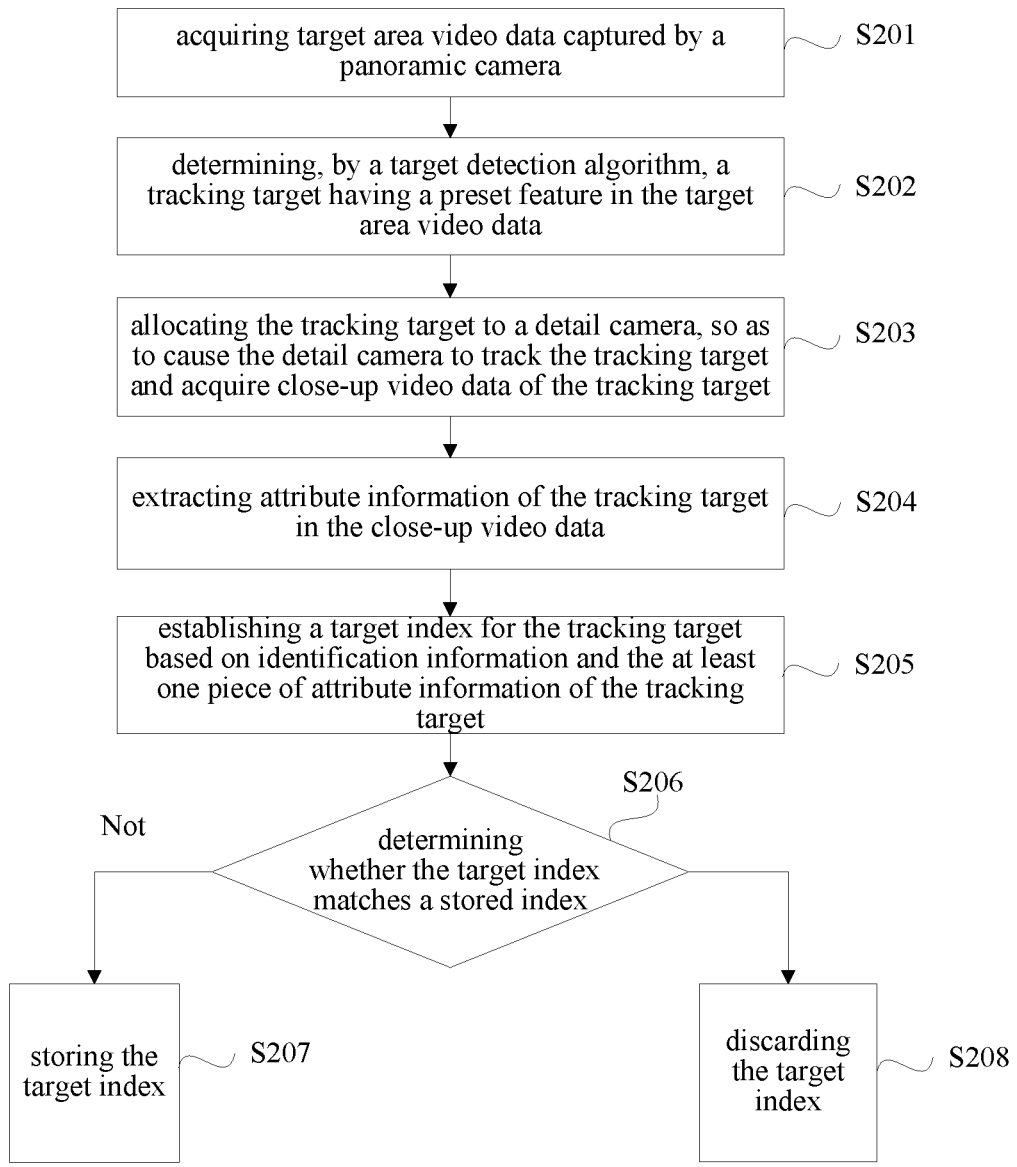
FIG. 2 is another flowchart of a method for extracting a target feature according to an embodiment of the present application.

As shown in FIG. 2, a method for extracting a target feature according to an embodiment of the present application may include the following steps.

S201, acquiring target area video data captured by a panoramic camera.

S202, determining, by a target detection algorithm, a tracking target having a preset feature in the target area video data.

S203, allocating the tracking target to a detail camera so as to cause the detail camera to track the tracking target and acquire close-up video data of the tracking target.

S204, extracting attribute information of the tracking target in the close-up video data.

The S201 to S204 are the same as the S101 to S104 in the above embodiment, and thus are not described herein again.

S205, establishing a target index for the tracking target according to identification information and at least one piece of attribute information of the tracking target.

In an embodiment of the present application, after determining a tracking target(s) having a preset feature in target area video data, the video processor may identify each tracking target, and each tracking target has identification information. For example, when there are four tracking targets, the tracking targets may be represented by different identification information. The identification information may be defined as any symbol, for example, the identification information may be 1, 2, 3, 4, and so on. The identification information may also be a, b, c, d, and so on.

The video processor may establish, according to the identification information and attribute information of each tracking target, a target index for this tracking target. The target indexes of three tracking targets are shown in table 1.

| Tracking target | Vehicle color | Vehicle type | Whether there are annual inspection marks |
|---|---|---|---|
| 1 | Red | Sport car | Yes |
| 2 | Yellow | Van | Yes |
| 3 | Black | Car | No |

S206, determining whether the target index matches a stored index.

After establishing a target index for the tracking target, the video processor may compare the target index with all target indexes that have been stored, or compare the target index with target indexes stored within a preset time period, so as to determine whether the target index of the tracking target is the same as any one stored index.

If the target index does not match a stored index, a step S207 of storing the target index is performed. If the target index matches a stored index, a step S208 of discarding the target index is performed.

In an embodiment of the present application, when there is no index that is the same as the target index of the tracking target in the stored indexes, the video processor may store the target index of the tracking target, which is easy to be checked by related personnel. When there is any index that is the same as the target index of the tracking target in the stored indexes, the video processor may discard data corresponding to the target index of the tracking target, to avoid the repeat storage of attribute information of a same tracking target.

In an embodiment of the present application, a video processor may determine, by a target detection algorithm, a tracking target having a preset feature in target area video data, to select a target(s), which meets user requirements, in the target area video data. Then, the video processor may extract attribute information of the selected target(s). In this way, the accuracy of extracting the attribute information of the targets can be improved. In addition, the video processor can discard duplicate index data for a target for which an index has been established, reducing storage pressure.

In the embodiment of the present application, preset target detection models corresponding to different types of targets may be trained and obtained with sample data of the different types of targets, so that features of a type of targets can be extracted by a corresponding preset target detection model. For example, a preset target detection model for humans may be trained and obtained with the sample data of humans, that is, a human can be detected from a video frame of video data by the preset target detection model for humans; a preset target detection model for vehicles can be trained and obtained with the sample data of vehicles, that is, a vehicle can be detected from a video frame of video data by the preset target detection model for vehicles; and so on.

In the embodiment of the present application, the above target scoring model may be a model trained and obtained with video frames for different preset attributes in advance. In one case, the video frames for different preset attributes are referred to as sample video frames. The preset attributes may include, but not be limited to, an image quality and definition of a sample video frame, and a target pose of a target included in the sample video frame. For example, 1000 sample video frames are acquired in advance, and different preset attributes of each video frame are ranked, and scores are set for these preset attributes according to ranked results. The higher the rank is, the higher the score is. For example, the image quality may include: excellent, good, medium, and poor. According to the image quality of a sample video frame, the image quality of the sample video frame is scored. Similarly, the definition, the target pose of the included target and so on of the sample video frame are scored. The above scores are called expected scores.

Subsequently, an initial scoring model is trained with each sample video frame and the expected scores of preset attributes of each sample video frame until the initial scoring model converges, to obtain the above target scoring model. The convergence of the above initial scoring model may refer to a difference of a preset loss function corresponding to the initial scoring model being less than a preset threshold. The above difference is a difference between an expected score of each preset attribute corresponding to each sample video frame and a predicted score of this preset attribute corresponding to this sample video frame obtained by the above initial scoring model. The target scoring model may be a preset convolutional neural network model.

Furthermore, close-up video frames in close-up video data are acquired, and the acquired close-up video frames are input into the target scoring model. The information such as the image quality, definition, target pose and the like of each close-up video frame is scored by the target scoring model. A score of each close-up video frame is obtained based on the score corresponding to the information such as the image quality, definition, target pose and the like of this close-up video frame. A close-up video frame with the highest scoring result is obtained based on the score of each close-up video frame, and at least one piece of attribute information of the tracking target in the close-up video frame with the highest scoring result is extracted.

Figure 3:
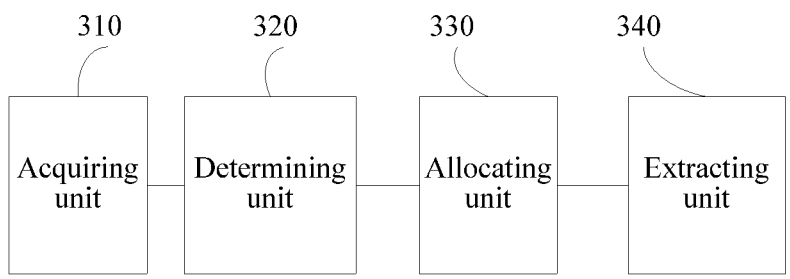
FIG. 3 is a schematic structural diagram of an apparatus for extracting a target feature according to an embodiment of the present application.

Corresponding to the above method embodiment, an embodiment of the present application further provides a corresponding apparatus embodiment. FIG. 3 shows an apparatus 300 for extracting a target feature according to an embodiment of the present application. The apparatus 300 includes:
- an acquiring unit 310, configured for acquiring target area video data captured by a panoramic camera;
- a determining unit 320, configured for determining, by a target detection algorithm, a tracking target having a preset feature in the target area video data;
- an allocating unit 330, configured for allocating the tracking target to a detail camera so as to cause the detail camera to track the tracking target and acquire close-up video data of the tracking target; and
- an extracting unit 340, configured for extracting attribute information of the tracking target in the close-up video data.

In an embodiment of the present application, a video processor may determine, by a target detection algorithm, a tracking target having a preset feature in target area video data. As such, the video processor may select targets meeting user requirements in the target area video data, and then the video processor may extract attribute information of each of the selected targets. In this way, the accuracy of extracting the attribute information of the targets can be improved.

As an implementation of the embodiment of the present application, the determining unit 320 is specifically configured for:
- acquiring a video frame of the target area video data; extracting image features of the video frame through a preset target detection model, wherein the preset target detection model is trained and obtained based on a plurality of targets having the preset feature; and matching the image features with a preset target detection feature, and determining an image feature matching the preset target detection feature as a tracking target, wherein the preset target detection feature is a set of targets having the preset feature.

As an implementation of the embodiment of the present application, the tracking target includes one or more tracking targets, and the allocating unit 330 is specifically configured for: after acquiring the video frame of the target area video data, acquiring first coordinates of each of the tracking targets in the video frame of the target area video data;
- allocating, according to the first coordinates, one detail camera for each of the tracking targets; converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

As an implementation of the embodiment of the present application, the extracting unit 340 is specifically configured for:
- acquiring close-up video frames in the close-up video data; obtaining, according to a target scoring model, scoring results of the close-up video frames, and selecting a close-up video frame with the highest scoring result; and
- extracting, from the close-up video frame with the highest scoring result, at least one piece of attribute information of the tracking target.

Figure 4:
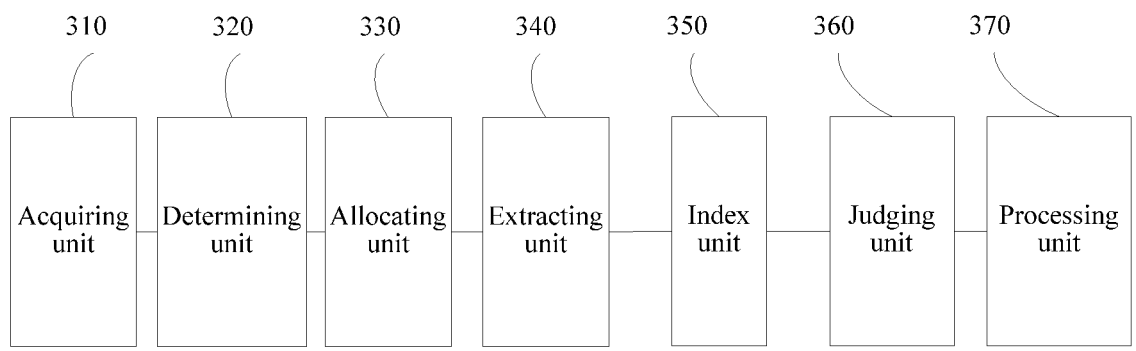
FIG. 4 is another schematic structural diagram of an apparatus for extracting a target feature according to an embodiment of the present application.

As an implementation of the embodiment of the present application, as shown in FIG. 4, in addition to the acquiring unit 310, the determining unit 320, the allocating unit 330 and the extracting unit 340, the apparatus 300 further includes:

an index unit 350, configured for establishing a target index for the tracking target based on identification information and the at least one piece of attribute information of the tracking target, wherein the tracking target includes one or more tracking targets; and the identification information is obtained by respectively identifying each of the tracking targets after determining the tracking targets having the preset feature in the target area video data;

a judging unit 360, configured for determining whether the target index matches a stored index; and a processing unit 370, configured for if the target index does not match a stored index, storing the target index, and if the target index matches a stored index, discarding the target index.

Figure 5:
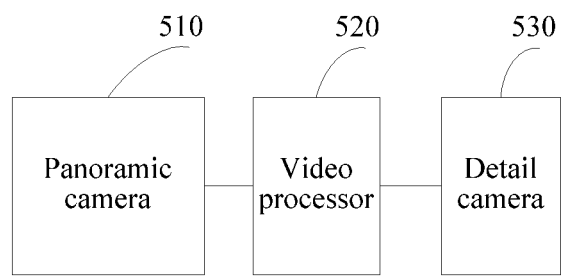
FIG. 5 is a schematic structural diagram of an application system for extracting a target feature according to an embodiment of the present application.

Furthermore, as shown in FIG. 5, an embodiment of the present application provides an application system for extracting a target feature, including a panoramic camera 510, a video processor 520, and a detail camera 530.

The panoramic camera 510 is configured for capturing target area video data.

The video processor 520 is configured for acquiring the target area video data captured by the panoramic camera; determining, by a target detection algorithm, a tracking target having a preset feature in the target area video data; allocating the tracking target to the detail camera so as to cause the detail camera to track the tracking target and acquire close-up video data of the tracking target; and extracting attribute information of the tracking target in the close-up video data.

The detail camera 530 is configured for tracking the tracking target and acquiring the close-up video data of the tracking target.

Specifically, the video processor may use the apparatus embodiment shown in FIG. 3 or FIG. 4 to complete the process of target feature extraction.

In an embodiment of the present application, a video processor may determine, by a target detection algorithm, a tracking target having a preset feature in target area video data. The video processor may select targets meeting user requirements in the target area video data, and then the video processor may extract attribute information of each of the selected targets. In this way, the accuracy of extracting the attribute information of the targets can be improved.

As an implementation of the embodiment of the present application, the video processor 520 is specifically configured for: acquiring a video frame of the target area video data; extracting image features of the video frame through a preset target detection model, wherein the preset target detection model is trained and obtained based on a plurality of targets having the preset feature; and matching the image features with a preset target detection feature, and determining an image feature matching the preset target detection feature as a tracking target, wherein the preset target detection feature is a set of targets having the preset feature.

As an implementation of the embodiment of the present application, the tracking target includes one or more tracking targets, and the video processor 520 is specifically configured for: after acquiring the video frame of the target area video data, acquiring first coordinates of each of the tracking targets in the video frame of the target area video data; allocating, according to the first coordinates, one detail camera for each of the tracking targets; converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

As an implementation of the embodiment of the present application, the video processor 520 is specifically configured for: acquiring close-up video frames in the close-up video data; obtaining, according to a target scoring model, scoring results of the close-up video frames, and selecting a close-up video frame with the highest scoring result; and extracting, from the close-up video frame with the highest scoring result, at least one piece of attribute information of the tracking target.

As an implementation of the embodiment of the present application, the video processor 520 is specifically configured for: establishing a target index for the tracking target based on identification information and the at least one piece of attribute information of the tracking target, wherein the tracking target includes one or more tracking targets; and the identification information is obtained by respectively identifying each of the tracking targets after determining the tracking targets having the preset feature in the target area video data; determining whether the target index matches a stored index; if the target index does not match a stored index, storing the target index, and if the target index matches a stored index, discarding the target index.

In the embodiment of the present application, the video processor may be integrated in a panoramic camera or may be integrated in a detail camera. When the video processor is integrated in the panoramic camera, a target index may be stored in a medium having storage function in the panoramic camera. When the video processor is integrated in the detail camera, the target index may be stored in a medium having storage function in the detail camera. It should be noted that, the video processor may be an independent processor, or the video processor may be integrated in an electronic device other than the panoramic camera and detail camera. For example, the device may be a computer device with the function of processing video data and extracting a target feature from video data, and the above target index may be stored in the computer device. The electronic device in which the video processor is located is not limited herein.

Figure 6:
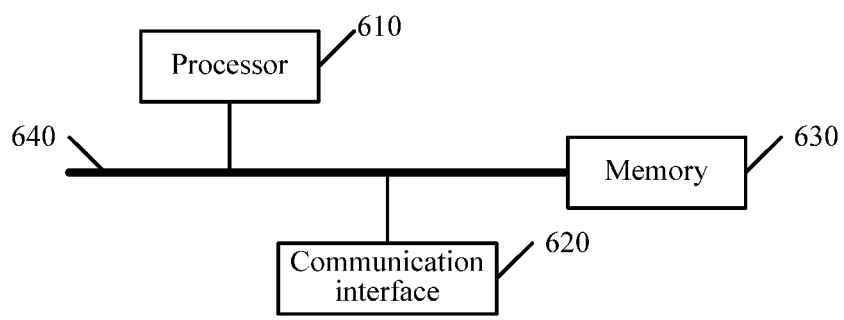
FIG. 6 is a schematic structural diagram of a computer device according to embodiment of the present application.

An embodiment of the present application further provides a computer device. As shown in FIG. 6, the computer device may include a processor 610, a communication interface 620, a memory 630 and a communication bus 640. The processor 610, the communication interface 620 and the memory 630 communicate with each other via the communication bus 640.

The memory 630 is used for storing a computer program.

The processor 610 is used for implementing the following steps when executing the program stored on the memory 630:

acquiring target area video data captured by a panoramic camera;

determining, by a target detection algorithm, a tracking target having a preset feature in the target area video data;

allocating the tracking target to a detail camera, so as to cause the detail camera to track the tracking target and acquire close-up video data of the tracking target; and extracting attribute information of the tracking target in the close-up video data.

The aforementioned communication bus in the computer device may be a Peripheral Component Interconnect (PCI) bus or an Extended Industry Standard Architecture (EISA)

bus and the like. The communication bus may include an address bus, a data bus, a control bus, and the like. For sake of illustration, the communication bus is represented by only one thick line in the figure, which does not mean there is only one communication bus or one type of communication bus.

The communications interface is used for communication between the computer device and other devices.

The memory may include a Random Access Memory (RAM), or may include a non-volatile memory (NVM), for example at least one disk memory. Optionally, the memory may also be at least one storage device located away from the processor described above.

The processor described above may be a general-purpose processor, including a Central Processing Unit (CPU), a Network Processor (NP); or may also be a Digital Signal Processing (DSP), an Application Specific Integrated Circuit (ASIC), Field-Programmable Gate Array (FPGA) or other programmable logic devices, discrete gate or transistor logic devices, discrete hardware components.

In an embodiment, the program is executed by the processor 610, so as to cause the processor 610 to perform operations of:
  acquiring a video frame of the target area video data;
  extracting image features of the video frame through a preset target detection model, wherein the preset target detection model is trained and obtained based on a plurality of targets having the preset feature; and
  matching the image features with a preset target detection feature, and determining an image feature matching the preset target detection feature as a tracking target, wherein the preset target detection feature is a set of targets having the preset feature.

In an embodiment, the tracking target comprises one or more tracking targets. The program is executed by the processor 610, so as to cause the processor 610 to perform operations of:
  after acquiring the video frame of the target area video data, acquiring first coordinates of each of the tracking targets in the video frame of the target area video data;
  allocating, according to the first coordinates, one detail camera for each of the tracking targets; and
  converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

In an embodiment, the program is executed by the processor 610, so as to cause the processor 610 to perform operations of:
  acquiring close-up video frames in the close-up video data;
  obtaining, according to a target scoring model, scoring results of the close-up video frames, and selecting a close-up video frame with the highest scoring result; and
  extracting, from the close-up video frame with the highest scoring result, at least one piece of attribute information of the tracking target.

In an embodiment, the program is executed by the processor 610, so as to cause the processor 610 to perform operations of:
  establishing a target index for the tracking target based on identification information and the at least one piece of attribute information of the tracking target, wherein the tracking target comprises one or more tracking targets; and the identification information is obtained by respectively identifying each of the tracking targets after determining the tracking targets having a preset feature in the target area video data;
  determining whether the target index matches a stored index; and
  if the target index does not match a stored index, storing the target index, and if the target index matches a stored index, discarding the target index.

The embodiment of the present application further provides a computer readable storage medium. The computer readable storage medium stores a computer program therein, and the computer program, when executed by a processor, implements the method for extracting a target feature described in the present application.

The embodiments of the apparatus/the system/the electronic device/the storage medium are described briefly since they are substantially similar to the embodiment of the method. Related contents can refer to the part that describes the embodiment of the method.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a/an . . . " or "include(s) a/an . . . " do not exclude that there are other identical elements in the processes, methods, articles, or devices which include these elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for extracting a target feature, comprising:
  acquiring target area video data captured by a panoramic camera;
  acquiring a video frame of the target area video data;
  extracting image features of the video frame through a preset target detection model, wherein the preset target detection model is trained and obtained with a plurality of targets having a preset feature through a convolutional neural network, wherein preset target detection models corresponding to different types of targets are trained and obtained with the different types of target;
  matching the image features with a preset target detection feature, and determining an image feature matching the preset target detection feature as a tracking target, wherein the preset target detection feature is a set of targets having the preset feature;

allocating the tracking target to a detail camera, so as to cause the detail camera to track the tracking target and acquire close-up video data of the tracking target; and extracting attribute information of the tracking target in the close-up video data, which comprises:

acquiring close-up video frames in the close-up video data;

obtaining, according to a target scoring model, scoring results of the close-up video frames, and selecting a close-up video frame with the highest scoring result, wherein the target scoring model is a model trained and obtained with various types of target sample data in advance, and the target sample data includes image quality, definition, target pose; and extracting, from the close-up video frame with the highest scoring result, at least one piece of attribute information of the tracking target.

2. The method of claim 1, wherein the tracking target comprises one or more tracking targets; the step of allocating the tracking target to a detail camera so as to cause the detail camera to track the tracking target and acquire close-up video data of the tracking target comprises:

after acquiring the video frame of the target area video data, acquiring first coordinates of each of the tracking targets in the video frame of the target area video data;

allocating, according to the first coordinates, one detail camera for each of the tracking targets;

converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

3. The method of claim 1, further comprising:

establishing a target index for the tracking target based on identification information and the at least one piece of attribute information of the tracking target, wherein the tracking target comprises one or more tracking targets; and the identification information is obtained by respectively identifying each of the tracking targets after determining the tracking targets having a preset feature in the target area video data;

determining whether the target index matches a stored index;

if the target index does not match a stored index, storing the target index, and if the target index matches a stored index, discarding the target index.

4. A non-transitory machine readable storage medium storing machine executable instructions that, when invoked and executed by an image processor, cause the image processor to implement the method for extracting a target feature of claim 1.

5. An application system for extracting a target feature, wherein, the application system comprising a panoramic camera, a video processor, a detail camera;

wherein the panoramic camera is configured for capturing target area video data;

the video processor is configured for acquiring the target area video data captured by the panoramic camera; acquiring a video frame of the target area video data; extracting image features of the video frame through a preset target detection model, wherein the preset target detection model is trained and obtained with a plurality of targets having a preset feature through a convolutional neural network, wherein preset target detection models corresponding to different types of targets are trained and obtained with the different types of target; matching the image features with a preset target detection feature, and determining an image feature matching the preset target detection feature as a tracking target, wherein the preset target detection feature is a set of targets having the preset feature; allocating the tracking target to the detail camera so as to cause the detail camera to track the tracking target and acquire close-up video data of the tracking target; and acquiring close-up video frames in the close-up video data; obtaining, according to a target scoring model, scoring results of the close-up video frames, and selecting a close-up video frame with the highest scoring result, wherein the target scoring model is a model trained and obtained with various types of target sample data in advance, and the target sample data includes image quality, definition, target pose; and extracting, from the close-up video frame with the highest scoring result, at least one piece of attribute information of the tracking target; and the detail camera is configured for tracking the tracking target and acquiring the close-up video data of the tracking target.

6. The application system of claim 5, wherein the tracking target comprises one or more tracking targets; the video processor is specifically configured for:

after acquiring the video frame of the target area video data, acquiring first coordinates of each of the tracking targets in the video frame of the target area video data; allocating, according to the first coordinates, one detail camera for each of the tracking targets; converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

7. The application system of claim 5, wherein the video processor is specifically configured for:

establishing a target index for the tracking target based on identification information and the at least one piece of attribute information of the tracking target, wherein the tracking target comprises one or more tracking targets; and the identification information is obtained by respectively identifying each of the tracking targets after determining the tracking targets having the preset feature in the target area video data; determining whether the target index matches a stored index; if the target index does not match a stored index, storing the target index, and if the target index matches a stored index, discarding the target index.

8. A computer device, wherein, the computer device comprises a processor, a communication interface, a memory and a communication bus, wherein the processor, the communication interface, and the memory communicate with each other via the communication bus;

the memory is configured for storing a computer program; and the computer program is executed by the processor, so as to cause the processor to perform operations of:

acquiring target area video data captured by a panoramic camera;

acquiring a video frame of the target area video data;

extracting image features of the video frame through a preset target detection model, wherein the preset target detection model is trained and obtained with a plurality of targets having a preset feature through a convolutional neural network, wherein preset target detection models corresponding to different types of targets are trained and obtained with the different types of target;

matching the image features with a preset target detection feature, and determining an image feature matching the preset target detection feature as a tracking target, wherein the preset target detection feature is a set of targets having the preset feature;

allocating the tracking target to a detail camera, so as to cause the detail camera to track the tracking target and acquire close-up video data of the tracking target;

acquiring close-up video frames in the close-up video data;

obtaining, according to a target scoring model, scoring results of the close-up video frames, and selecting a close-up video frame with the highest scoring result, wherein the target scoring model is a model trained and obtained with various types of target sample data in advance, and the target sample data includes image quality, definition, target pose; and extracting, from the close-up video frame with the highest scoring result, at least one piece of attribute information of the tracking target.

9. The computer device of claim 8, wherein the tracking target comprises one or more tracking targets; and the processor is further caused to perform operations of:

after acquiring the video frame of the target area video data, acquiring first coordinates of each of the tracking targets in the video frame of the target area video data;

allocating, according to the first coordinates, one detail camera for each of the tracking targets;

converting the first coordinates of each of the tracking targets into second coordinates of this tracking target in the allocated detail camera, and sending the second coordinates and this tracking target to the allocated detail camera, such that this detail camera tracks and captures the allocated tracking target, and acquires close-up video data of this tracking target.

10. The computer device of claim 8, wherein the processor is further caused to perform operations of:

establishing a target index for the tracking target based on identification information and the at least one piece of attribute information of the tracking target, wherein the tracking target comprises one or more tracking targets; and the identification information is obtained by respectively identifying each of the tracking targets after determining the tracking targets having a preset feature in the target area video data;

determining whether the target index matches a stored index;

if the target index does not match a stored index, storing the target index, and if the target index matches a stored index, discarding the target index.

* * * * *